(12) United States Patent
Vandenbroucke et al.

(10) Patent No.: US 10,189,225 B2
(45) Date of Patent: Jan. 29, 2019

(54) HOSE WITH OPTIMIZED STEEL WIRE REINFORCEMENT LAYERS

(71) Applicant: NV BEKAERT SA, Zwevegem (BE)

(72) Inventors: Ben Vandenbroucke, Anzegem (BE); Peter Galle, Denderwindeke (BE)

(73) Assignee: NV BEKAERT SA, Zwevegem (BE)

( * ) Notice: Subject to any disclaimer, the term of this patent is extended or adjusted under 35 U.S.C. 154(b) by 258 days.

(21) Appl. No.: 14/898,419

(22) PCT Filed: Jun. 26, 2014

(86) PCT No.: PCT/EP2014/063471
§ 371 (c)(1),
(2) Date: Dec. 14, 2015

(87) PCT Pub. No.: WO2015/000773
PCT Pub. Date: Jan. 8, 2015

(65) Prior Publication Data
US 2016/0136918 A1    May 19, 2016

(30) Foreign Application Priority Data
Jul. 4, 2013    (EP) .................................... 13175073

(51) Int. Cl.
*B32B 1/08*      (2006.01)
*B32B 27/12*     (2006.01)
(Continued)

(52) U.S. Cl.
CPC ................. *B32B 1/08* (2013.01); *B32B 7/02* (2013.01); *B32B 27/12* (2013.01); *F16L 11/082* (2013.01);
(Continued)

(58) Field of Classification Search
CPC ......... B32B 15/00; B32B 15/02; B32B 15/04; B32B 5/02; B32B 5/10; B32B 9/041; D07B 2205/3025
(Continued)

(56) References Cited

U.S. PATENT DOCUMENTS 4,273,160 A    6/1981  Lowles
4,722,210 A *  2/1988  Bourgois ................ B29C 55/22
                                                   138/127

(Continued)

FOREIGN PATENT DOCUMENTS

EP          0200253 A       11/1986
JP     2005-291466 A        10/2005
(Continued)

OTHER PUBLICATIONS

International Search Report dated Sep. 16, 2014, for PCT/EP2014/063471.

*Primary Examiner* — Lee E Sanderson
*Assistant Examiner* — Michael C Romanowski
(74) *Attorney, Agent, or Firm* — Bacon & Thomas, PLLC

(57) ABSTRACT

A high pressure hose having steel wires with different load elongation properties, which are introduced into the subsequent reinforcement layers of the hose. The difference in load elongation is quantified by the E-ratio of the wire that is equal to the tensile strength divided by the elongation at break. The steel wires of the radially outermost steel wire reinforcement layer have the highest E-ratio, while the radially innermost steel wire reinforcement layer has the lowest E-ratio. The E-ratio of any steel wire reinforcement layer is not lower than the E-ratio of any inner laying steel wire reinforcement layer. The E-ratio of the steel wires can be influenced by either a thermal treatment or by a mechanical treatment. In the mechanical treatment crimps or bends (Continued)

can be introduced into the wire by guiding them through a preforming device.

15 Claims, 7 Drawing Sheets

(51) Int. Cl.
 *B32B 7/02* (2006.01)
 *F16L 11/08* (2006.01)
(52) U.S. Cl.
 CPC ............ *F16L 11/083* (2013.01); *F16L 11/086* (2013.01); *F16L 11/087* (2013.01); *F16L 11/088* (2013.01); *B32B 2262/103* (2013.01); *B32B 2274/00* (2013.01); *B32B 2307/51* (2013.01); *B32B 2307/54* (2013.01); *B32B 2597/00* (2013.01)
(58) Field of Classification Search
 USPC ....... 138/124, 126, 127, 129, 134, 137, 144, 138/172; 57/206
 See application file for complete search history.

(56) References Cited

U.S. PATENT DOCUMENTS

| | | | |
|---|---|---|---|
| 7,328,725 B2* | 2/2008 | Henry | F16L 11/082 138/124 |
| 2006/0081319 A1* | 4/2006 | Fukutani | B29D 30/38 152/451 |
| 2007/0034275 A1* | 2/2007 | Henry | F16L 11/082 138/124 |

FOREIGN PATENT DOCUMENTS

| | | |
|---|---|---|
| WO | 95/16816 A1 | 6/1995 |
| WO | 99/28547 A1 | 6/1999 |
| WO | 92/50464 A1 | 6/2002 |
| WO | 2005/108846 A1 | 11/2005 |
| WO | 2007/020503 A2 | 2/2007 |

\* cited by examiner

HOSE WITH OPTIMIZED STEEL WIRE REINFORCEMENT LAYERS

TECHNICAL FIELD

The invention relates to hoses for conveying fluids under pressure that are also known as high pressure hoses or hydraulic hoses and to a method to produce such kind of hose.

BACKGROUND

High pressure, flexible hoses for conveying fluids under high pressure such as hydraulic oil, water, but also steam or gasses are omnipresent in all kinds of equipment and vehicles to effectively transfer motion or fluids between parts that can move relative to one another.

Typically these kind of hoses consist of an elastomer core tube that contains the fluid around which one or more reinforcement layers have been spirally wound while being radially separated by intermediate layers of elastomer material. An outer layer is generally applied on the outermost reinforcement layer for covering the reinforcement such that it does not get damaged.

The reinforcement layer is crucial to the functioning of the hose in that it does not only impart strength to the hose but also keeps the hose flexible. The reinforcement layer must be able to withstand highly variable pressures with shock waves propagating through the fluid. As hoses are many times used in harsh environments and convey aggressive fluids at high or low temperatures the reinforcement layer must maintain its properties of strength, flexibility and fatigue resistance also in these circumstances.

While in the past expectations from novel synthetic reinforcement fibers such as long chain synthetic polyamide based aramids, or ultra-high molecular weight polyethylene oriented fibres were high, the most used material for reinforcing high pressure hose is still the plain steel wire, possibly coated with an adhesive layer.

The steel wires can be applied around the core tube in a number of ways such as in:
- Spiralled hoses wherein the wires are wound parallel to one another in a helicoidal way. Preferably the reinforcement layers are paired and wires of members of a pair are wound in opposite directions while being separated by an intermediate polymer or elastomer layer. Or
- The reinforcement layer can be braided which can be described as a pair of spiral layers wound closely together without an intermediate elastomer layer. The wires of each spiral layers are grouped in ribbons, and the ribbons of one layer are interwoven with the ribbons of the other layer. The interweaving can be according a plain weave, twill weave or satin weave.

The steel wires in the hose are wound under a helix angle that is conventionally set as the angle between the tangent vector to the steel wire and the axis of the helix. When the angle is close to the so called 'neutral angle' the reinforcement will behave neutral when pressure is applied to the hose: the hose will neither shorten nor elongate. The neutral angle is A $\tan(\sqrt{2})$ which is about 54°44'.

From the mechanical point of view the hose must fulfil some basic requirements:
- It must have sufficient burst pressure (BP) i.e. the pressure at which the weakest wall part of a test piece yields. The burst pressure is amongst other factors directly depending on the breaking load and the number of reinforcing fibres in the reinforcement layer. Other factors are the construct of the hose: number of layers, radial positions of layers, lay angles, spiralled or braided, rubbers used, etc.
- A hose must be used below its burst pressure at a certain working pressure (WP). Depending on the application of the hose a safety factor is used that for hydraulic applications is generally set to 4. The pressure at which the hose is intended to be used should then not be larger than one quarter of the burst pressure.
- As hoses are subject to impulse pressures for example due to pumping cycle, valve closing, fluid hammer and other abuse impulse life testing is used to simulate the effect of those phenomena. During impulse life testing a piece of hose is square wave pressure loaded from near zero up to 125% or 133% (depending on hose construction) of the working pressure and back with a certain repetition rate and duty cycle. The test is either stopped due to failure of the hose or when a prescribed number of cycles has been reached. Possibly a surviving test piece is subject to a final burst test to assess the final performance of the hose.

The following prior art in the field of steel wire reinforced high pressure hoses is of particular relevance to the invention:
- JP 2005 291466 (Yokohama Rubber Co Ltd) describes a hose that comprises layers of steel filaments that have received a two-dimensional waveform or a three dimensional spiral shape before incorporation of the wires into the reinforcement layers of the hose. The waveform or spiral shape must be such that the wire elongates at least 0.35 at 20% of its breaking load, but not more than 15%. The purpose is to dampen pulsation waves through the hose. The wires are of equal make throughout the hose. The drawback is that not all wires may be loaded to the maximum of their capabilities.
- U.S. Pat. No. 4,273,160 (Parker-Hannifin) describes a flexible high pressure hose with at least two layers of stranded reinforcement, wherein the modulus of elasticity of the material within one layer increases when radially going outward. The text mentions the use of metal wires only for the outer layer, while the inner layers are made of synthetic fibres. Hence two different types of material are needed.
- WO 2007/020503 (Eaton Corporation) describes a high pressure hose comprising at least two reinforcement layers with different tensile strength of which the inner layer has a lower tensile strength than the outer layer. The assumption is that a lower tensile strength of the wire leads to an increased fatigue life of the steel wire and hence an increased pulse life. Different tensile classes of steel wire are used within a single hose. No mention is made of the elongation at break of those wires.
- EP 0200253 (Bekaert) describes a method to condition a hose reinforced with steel wires that all have been stress relieved in order to have a higher elongation at break. By applying a high 'preconditioning pressure' of more than 90% of the burst pressure of the hose, the wires are permanently elongated at the optimal load sharing. The method is an additional extra treatment that is not without risk.

The prior art hoses therefore suffer from the mentioned drawbacks that the inventors solved with the below described innovative high pressure hose.

SUMMARY OF THE INVENTION

The primary object of the invention is to provide a hose that does away with the drawbacks of the prior art. It is a further object of the invention to provide a reinforcement a hose that has an optimal load sharing between all reinforcement layers so that at burst all reinforcement is loaded equally and to its maximum. A further objective is to have an optimal load sharing in the hose reinforcement not only at burst pressure but also on any intermediate pressure up to burst pressure in order to improve the impulse life of the hose. Further, an increased flexibility of the hose is aimed at. Another object is to provide a hose with a minimum of different reinforcement materials to reduce material stock. Further, it is the objective of the inventors to provide a method to produce the advantageous hose. As a last objective of the invention the materials fed to the hose building machine are equal and the changes are brought on the wire in the hose building machine itself or on the rewinder that spools the wire bundles on bobbins for the hose building machine.

According a first aspect of the invention a hose for conveying fluids under pressure as defined by the features of claim 1 is claimed. The hose is built up around an elastomer core tube as known in the art. The tube can be extruded on a mandrel or the tube can be self-supporting. It is made of an elastomer material that is compatible with the fluid to be conveyed.

The hose comprises at least two reinforcement layers at discrete reinforcement radii. At least two of those reinforcement layers comprise steel wires helically wound around the axis of the hose. In what follows a reinforcement layer refers to either a single layer of spiralled wires in case of a spiralled layer or the doubled layer of braided wires in case of a braided layer. In both cases the reinforcement layer is present at a discrete radius from the axis of the hose.

The at least two reinforcement layers are radially separated by intermediate elastomer material layers. In case of two reinforcement layers only one intermediate layer is present. The intermediate elastomer material layers are important in that they transfer stresses through the pipe wall from one reinforcement layer to the next. Intermediate elastomer material should also adhere well to the reinforcement layers in order to preserve integrity of the hose. The thickness of the intermediate layer can be practically null for example for thermoplastic hoses as layers can be glued to one another. For thermosetting elastomers the thickness is of the order of magnitude of the steel wire reinforcement layer thickness i.e. between a quarter to four times the diameter of the steel wire.

The hose is finished by a protective layer covering the outermost reinforcement layers. The protective layer can be made of an elastomer material or another harder material. Possibly it comprises textile materials for increasing the wear resistance of the hose.

Whenever reference to an 'elastomer' is made in this application an elastic polymer material is meant that can either be thermosetting (requiring vulcanisation or heat treatment) or thermoplastic.

Thermosetting elastomers are typically rubber materials such as natural or synthetic rubbers. Synthetic rubbers like NBR (Acrylonitrile Butadiene), SBR (Styrene Butadiene), EPDM (Ethylene Propylene Diene Monomer) or CR (Polychloroprene) or silicone rubbers are favoured for use in hoses. Of course different additives can be added to the polymer to adapt its properties.

Thermoplastic elastomeric materials can be e.g. thermoplastic polyurethanes, thermoplastic polyamides, polyolefin blends, thermoplastic co-polyesters, thermoplastic fluoropolymers such as polyvinylidene difluoride, or even polyoxymethylene (POM). Although their use is not so widespread as rubber hose material, they find specific uses in niche applications.

The invention is characterised by the inventive adaptations of the steel wires used in the at least two steel wire reinforcement layers. Practical steel compositions of the steel wire used for the reinforcement of high pressure hoses—called hose reinforcement wire—do not only comprise iron and carbon but also other alloy and trace elements, some of which have a profound influence on the properties of the steel in terms of strength, ductility, formability, corrosion resistance and others. The following are possible constituents of the wire rod used for hose reinforcement wire:

At least 0.70 wt % of carbon, the upper limit being dependent on the other alloying elements forming the wire (see below). Carbon is the main driver for the strain hardening of steel wire. With more carbon higher ultimate tensile strengths can be obtained with increased wire drawing reduction.

A manganese content between 0.30 to 0.70 wt %. Manganese adds—like carbon—to the strain hardening of the wire and also acts as a deoxidiser in the manufacturing of the steel.

A silicon content between 0.15 to 0.30 wt %. Silicon is used to deoxidise the steel during manufacturing. Like carbon it helps to increase the strain hardening of the steel.

Presence of elements like aluminium, sulphur (below 0.03%), phosphorous (below 0.30%) should be kept to a minimum.

The remainder of the steel is iron and other elements that have other influences on the steel:

The presence of chromium (0.005 to 0.30% wt), vanadium (0.005 to 0.30% wt), nickel (0.05-0.30% wt), molybdenum (0.05-0.25% wt) and boron traces may reduce the formation of grain boundary cementite for carbon contents above the eutectoid composition (0.80% wt C) and thereby improve the formability of the wire. Such alloying enables carbon contents of 0.90 to 1.20% wt, resulting in ultimate tensile strengths that can be higher as 4000 MPa in drawn wires.

Alternatively—for special applications wherein corrosion is a risk—hose reinforcement wire made from stainless steels may be employed. Preferred stainless steels contain a minimum of 12% Cr and a substantial amount of nickel. More preferred stainless steel compositions are austenitic stainless steels as these can easily be drawn to fine diameters. The more preferred compositions are those known in the art as AISI 302 (particularly the 'Heading Quality' HQ), AISI 301, AISI 304 and AISI 314. 'AISI' is the abbreviation of 'American Iron and Steel Institute'.

Hose reinforcement wires predominantly have a round, circular cross section. However it has advantages to use flattened wires as disclosed in WO 2005/108846. The use of such flattened wires is a priory not excluded from the current invention. Round hose reinforcement wires are available in diameters from 0.15 to 0.80 mm in steps of 0.05 mm. Sometimes intermediate diameters such as 0.28, 0.33, 0.56, 0.61, or 0.71 mm are provided to accommodate for optimised standard hoses. In general in braided reinforcement layers wires with a diameter of less than or about 0.40 mm are used. For spiralled hoses mainly thicker wires are used up to 0.80 mm.

The tensile strength of a hose reinforcement wire is defined as the breaking load (the force at which the wire breaks, in N) divided by its metallic surface and is expressed in N/mm² or MPa. There is no standardised classification system but in Europe and Asia—and for the purpose of this application—the following definition of 'tensile classes' are generally accepted:

Low Tensile LT 2150 to 2450 N/mm²
Normal Tensile NT 2450 to 2750 N/mm²
High Tensile HT 2750 to 3050 N/mm²
Super Tensile ST 3050 to 3350 N/mm²

Hose reinforcement wire is provided with an adhesive coating layer that can be zinc, copper or brass. Alternatively organic adhesion promoters can be provided on the wire.

A hose reinforcement wire has a 'percentage total elongation at fracture $A_t$,' or simply 'elongation at break' as defined in ISO 6892:1998(E), item 4.4.3. It is the total elongation of the gauge length at the moment of fracture, expressed as a percentage of the original gauge length (in %). The elongation at break of the hose reinforcement wires of interest for this application comprises three components:

There is the elastic elongation due to the linear behaviour of the steel itself. After removal of the load the elastic elongation disappears.

There is the plastic elongation due to the plastic deformation of the steel itself. After removal of the load the plastic elongaton remains in the wire i.e. the wire has lengthened.

There is the structural elongation that is due to the deformation of the wire. A straight wire does not have a structural elongation.

Within the context of this application an 'E-ratio' of a steel wire is defined as the ratio of the tensile strength divided by the elongation at break of that wire. It is expressed in units of N/mm². It must be noted that this E-ratio—although it has the same units as a modulus—is not to be regarded as such. A modulus—as known from Hooke's law—implies the presence of a linear region in the stress-strain diagram starting at zero load and elongation. Wires of the current application may not show a linear region at all or at the most a very small one. The E-ratio corresponds to the slope of the line connecting the origin to the point at break in a stress-strain diagram.

The inventive hose is characterised in that the steel wires of the radially outermost steel wire reinforcement layer have the highest E-ratio, the steel wires of the innermost steel wire reinforcement layer have the lowest E-ratio. These lowest and highest E-ratio differ from one another. Further, the E-ratio of any steel wire reinforcement layer is not lower than the E-ratio of any inner laying steel wire reinforcement layer. This simply means that the E-ratio must increase or be equal when stepping through the steel reinforcement layers from the radially innermost to the radially outermost layer.

In a first preferred embodiment, this E-ratio is between 70 000 N/mm² up to 200 000 N/mm², or between 85 000 to 160 000 N/mm² or even between 90 000 N/mm² and 140 000 N/mm² for the radially outermost steel wire reinforcement layer. The innermost steel wire reinforcement layer must have a lower E-ratio between 30 000 N/mm² and 120 000 N/mm², or between 40 000 and 110 000 or between 50 000 and 105 000 N/mm² or between 50 000 and 90 000 N/mm². Within a single embodiment, the ranges for radially outermost and innermost layer must be distinct and non-overlapping.

One of the main challenges when designing high pressure hoses remains the equal loading of the steel wires such that they all reach their maximum load capacity at the same pressure and that no layer is overloaded prematurely leading to an avalanche collapse of the remaining layers. The current invention solves this problem by adapting the E-ratio between the various layers.

A first way to change the E-ratio is to subject the steel wires of at least the innermost layer to a heat treatment, while the steel wires of at least the outermost layer are 'as drawn'. Such a heat treatment is also known as "stress relieving treatment" and is performed by subjecting the steel wires to a high temperature above 350° C. and for a certain time in a protective atmosphere. An 'as drawn' wire is the wire as obtained from the wire drawing machine without any additional, intentional heat treatment applied. In this way the total elongation of the wire can be easily doubled with a loss in strength of at most 20%. An 'as drawn' steel wire with an E-ratio of 'A' will after thermal treatment show an E-ratio of A×0.425 or lower. It is indeed quite difficult to control this thermal treatment process and it is not possible to tune the process so that an E-ratio of above A×0.425 is obtained starting from a wire having an E-ratio 'A'.

In a second preferred embodiment the steel wires of the outermost reinforcement layer comprises steel wires 'as drawn' i.e. without having been subjected to any thermal treatment and having an E-ratio of between 70 000 N/mm² up to 200 000 N/mm², or between 85 000 to 160 000 N/mm² or even between 90 000 N/mm² and 140 000 N/mm². The steel wires of at least the innermost layer comprises steel wires that have been subjected to a thermal treatment and therefor have an E-ratio between 30 000 N/mm² and 120 000 N/mm², or between 40 000 and 110 000 or between 50 000 and 105 000 N/mm² or between 50 000 and 90 000 N/mm².

Another preferred way to change the E-ratio is to introduce bends or crimps in the wire. Preferably at least the steel wires of at least the innermost steel wire reinforcement layer have crimps or bends. The steel wires of the outermost reinforcement layer are then free of crimps or bends i.e. are not deformed (except of course to take the helicoidal path of the reinforcement). This is a third preferred embodiment.

With a bend is meant that, following the path of the wire in the hose, the wire is deflected unidirectional, always in the same direction, either left, left, left, . . . or right, right, right, . . . . It is readily clear that such a deformation will ultimately results in a path around some axis. This is by preference the axis of the hose around which the steel wire is helicoidally wound.

A bend in a wire is discernible by an abrupt change in direction of the wire along its path. Alternatively worded: a wire with a bend will show a changing radius of curvature when travelling along the wire. At the bend, the curvature will increase (i.e. the radius of curvature is small) compared to the curvature of the segments in between where the curvature is close to zero (i.e. the radius of curvature is large).

A crimp is two bends following one another wherein the bending direction of the first bend is opposite to that of the following bend. The wire shows an alternating sequence of bends in opposite directions (left, right, left, right, . . . ) within a single plane. The wire takes a zig-zag shape.

Crimps in different planes can also be combined in order to impart an even higher structural elongation to a wire. For example a first crimp can be made in a first plane while this crimped wire is subsequently crimped in a second plane substantially perpendicular to the first plane. Two single crimps are then observable in two view directions that are perpendicular to one another. The advantage of having a bi-plane crimped reinforcement wire is that the same amount of elongation at break can be obtained within a smaller circumscribed cylinder around the wire than with a wire having a single crimp in one plane.

Altering the E-ratio of the steel wires through bending or crimping the wire offers some advantages over thermal treatments:
- There is little loss in tensile strength when the crimping or bending is correctly done.
- The increase in elongation at break is well controllable and can be tuned more precisely compared to a thermal treatment process.

For example the elongation at break of the steel wires with crimps or bends can be tuned to be at least 0.3% higher than the elongation at break of the straight wire. At the other extreme, an extra structural elongation of plus 4% compared to the straight wire can be easily build-in into the wire. By preference an additional elongation of between 0.3 to 3% or 0.3 to 2%, or even between 0.3 to 1.5% can possibly build-in into the steel wire. This is a fourth preferred embodiment.

For ease of logistics and stock keeping, it is best that the steel wires for at least the innermost and outermost reinforcement layers are of the same tensile class. Also preferred is if the steel wires are not only of the same tensile class but also of the same diameter. The wires of at least the innermost reinforcement layer then only differ from those the outermost layer in that the former ones have received a thermal treatment or are provided with crimps or bends while the latter ones are free of thermal treatment and/or crimps or bends.

For example the steel wires of the outermost reinforcement layer and the innermost reinforcement layer originate from one same diameter and tensile strength class whereby the outermost reinforcement layer is in the as drawn state having an E-ratio 'A', while the innermost layer has been subjected to a heat treatment such that its E-ratio is 0.425×A or lower.

Alternatively, in a highly preferred embodiment, by bending or crimping the 'as drawn' wire having an E-ratio of 'A' the inventors can tune the E-ratio to become between 0.33×A to 0.95×A or better between 0.50×A and 0.90×A to a precise and consistent degree.

By preference the bending or crimping is done with a fixed periodicity i.e. there is a fixed distance between successive bends or the crimps have a specific, fixed wavelength. The preforming of bends and crimps given to the steel wires should not be confused with the up and down movement of the steel wire ribbons in a braided configuration. The periodicity of the bends or the wavelength of the crimp differs from the periodicity of the interweaving pattern of the braid. Hence, the wire bends induced by braiding are specifically excluded from being bends or crimps according the invention.

According a second aspect of the invention, a method is disclosed for making the hose as described above. The method comprises the steps of:
- Providing an elastomer core tube;
- Winding steel wires around said elastomer tube in a spiralled or braided innermost steel wire reinforcement layer;
- Applying an intermediate elastomer material layer on said innermost steel wire reinforcement layer;
- Winding one more spiralled or braided steel wire reinforcement layer on said intermediate elastomer layer;
- Optionally applying an intermediate elastomer material layer on said then outermost steel wire reinforcement layer;
- Optionally applying another spiralled or braided steel wire reinforcement layer on said intermediate elastomer material layer;
- Optionally repeating the two previous steps one or more times;
- Applying an outer protective layer covering the outermost reinforcement layer.

With the characteristic feature that the steel wires of said innermost steel wire reinforcement layer have an E-ratio that is lower than the E-ratio of the steel wires of said radially outermost steel wire reinforcement layer, whereby the E-ratio of any steel wire reinforcement layer is not lower than the E-ratio of any inner laying steel wire reinforcement layer.

Preferably the method above is preceded by applying a thermal treatment on the steel wires of at least the innermost steel wire reinforcement layer such that they show an E-ratio between 30 000 and 120 000 N/mm$^2$ while the E-ratio of the steel wires of at least the outermost steel wire reinforcement layer is between 70 000 N/mm$^2$ and 200 000 N/mm$^2$.

Alternatively and even more preferred is if the above method is preceded by the preforming of the steel wires of at least the innermost steel wire reinforcement layer with a preforming device that induces crimps or bends into said steel wires. The preforming of the wires can be done per single wire for example by the supplier of the wire prior to winding on the customer spool. Alternatively, the preforming can be done off-line on the bobbin winders during winding of the steel wires on the machine bobbins before they are mounted on the braider or the spiralling machine. Here the wires can either be preformed individually (one preforming device per wire) or in group (one preforming device per group of wires). The latter is somewhat preferred as it reduces the number of preforming devices. In group preforming results also in a synchronised bending or crimping making the ribbons more closed as compared to individual crimping wherein gaps form between the individual filaments of a ribbon.

A preferred alternative is if the preforming of the steel wires is performed concurrently with, in-line with, during the winding of said innermost steel wire reinforcement layer. This can be done by mounting the preforming device on the spiral winder or braider of the hose building machine. The tension of the spiral winder or braider—about 8 to 10 N—is already sufficient to induce a bend or crimp on the steel wire. The preforming is then 'in-line'

The preforming device can for example comprise a rotatable pin of substantially polygonal shape where over said steel wires are led under tension thereby inducing periodical unidirectional bends on said steel wires. By preference a group of steel wires—for example as in a braiding ribbon— are led simultaneously over the rotatable pin. In this way bends are induced in phase and of equal bending degree between steel wires and the number of rotating preforming pins can be minimised.

The preforming device can alternatively comprise a pair of intermeshing crimping wheels where between said steel wires are led thereby inducing periodical bi-directional crimps in said wires. Again steel wires can be grouped and led together between said crimping wheels resulting in steel wires that are crimped in phase with equal amplitude. Grouping the wires also leads to a reduced number of crimping devices.

According a third aspect of the invention, a hose building machine is claimed. The hose building machine can be a wire spiral machine wherein wires are wound individually or grouped around a centrally moving intermediate hose body. At least for every spindle axis of the first deposition carrousel a preforming device is provided. Alternatively the hose building machine can be a braiding machine. At least the spool carriers of the firstly deposited steel wire reinforcement are equipped with a wire preforming device. The preforming device induced crimps or bends onto the wire when being pulled through.

According a further aspect of the invention a rewinder for rewinding customer spools to braider bobbins is claimed. A number (5 to 17) of steel wires are wound at equal tension from customer spools in a ribbon onto the braider bobbin. The ribbon of steel wires is preformed in a unidirectional bends or bidirectional crimps by a bending or crimping device mounted before or after the beak of the rewinder. The wires in one ribbon are all crimped or bend with the same wavelength, amplitude and phase.

DETAILED DESCRIPTION OF THE INVENTION

While for a thick walled isotropic tube under high pressure the hoop, radial and axial stresses can be calculated by the laws of continuum mechanics, a steel wire reinforced hose is a more intricate system due to the non-isotropy of the load carrying members—the steel wires—and the large differences in material behaviour of the steel and the elastomer material. Therefore the inventors resorted to finite element modelling in order to corroborate their ideas.

In a first embodiment a braided hose of following build was analysed:

TABLE I

| Braided hose | |
|---|---|
| Inner diameter of core tube | 9.52 mm |
| Diameter of first steel wire reinforcement layer | 16.12 mm |
| Braided layer of 12 × 7 steel wires in S and 12 × 7 steel wires in Z | |
| Winding angle | 53.5° |
| Diameter of steel wire | 0.295 mm |
| Thickness of intermediate elastomer material layer | 0.99 mm |
| Diameter of second steel wire reinforcement layer | 18.10 mm |
| Braided layer of 12 × 7 steel wires in S and 12 × 7 steel wires in Z | |
| Winding angle | 55.5° |
| Diameter of steel wire | 0.295 mm |
| Thickness outer protective layer | 2.79 mm |
| Intended work pressure | 35 MPa |

Figure 1A:
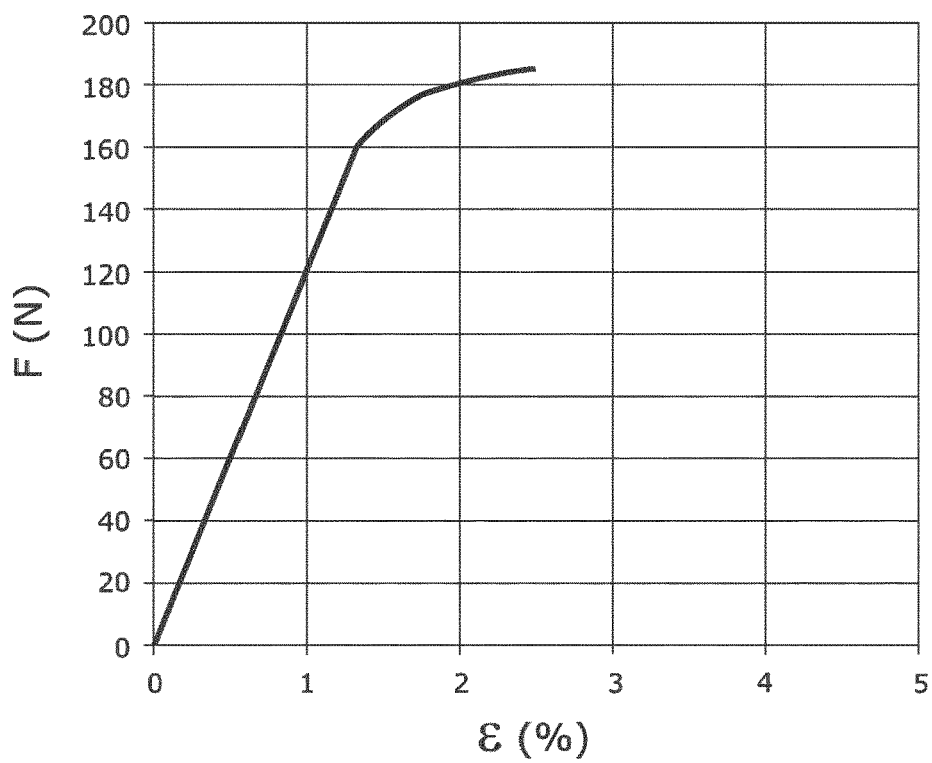
FIG. 1a describes the load elongation curve of a conventional hose reinforcement wire of diameter 0.295, 1b shows the load elongation curve of a heat treated hose reinforcement wire, 1c shows the load elongation curve of a wire having crimps.

In order to evaluate the model the tensile properties of a conventional steel wire was used for both reinforcement layers. The force (F (in N)) Elongation (in %) curve of the wire is depicted in FIG. 1a. The wire has a diameter of 0.295 mm, a breaking load of 184 N—hence a tensile strength of 2692 N/mm² i.e. Normal Tensile class—and shows an elongation at break of 2.5%. It follows that the E-ratios of both reinforcement layers are equal to 107 689 N/mm².

Figure 2:
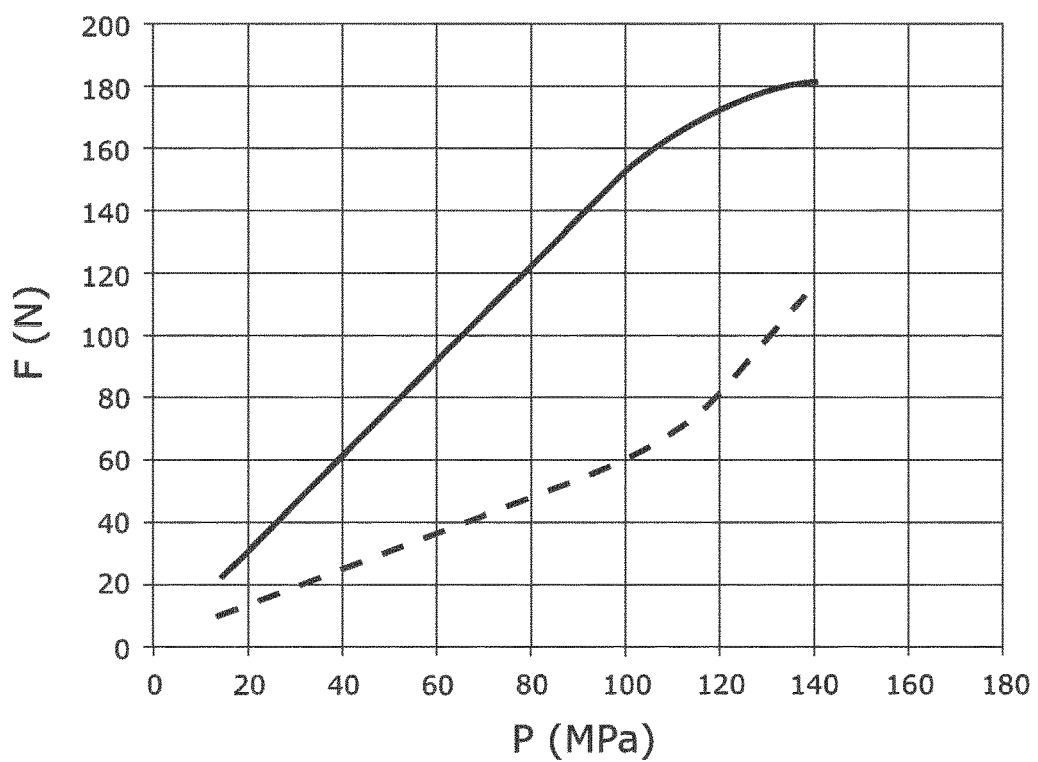
FIG. 2 describes tensile load on the steel wires in the inner and outer layer reinforcement layer in a conventional braided hose as a function of hose pressure.

FIG. 2 shows the resulting force (F (in N) in ordinate) on the wires of the inner layer (full line) and outer layer (dashed line) when the hose is pressurised (P (in MPa) in abscissa). It is clear that the first layer is first loaded as pressure rises thereby taking all the load and screening off the second layer. It is not until the inner layer wires start to yield—which occurs at about 100 MPa—before the outer layer takes up more load. Hence the tensile strength of the inner layer is reached well before the outer layer wires attain their ultimate tensile strength. Burst therefore occurs due to the collapse of the inner layer at about 140 MPa. At that moment, the outer layer steel wires are only loaded up to 66% of their capability.

Figure 1B:
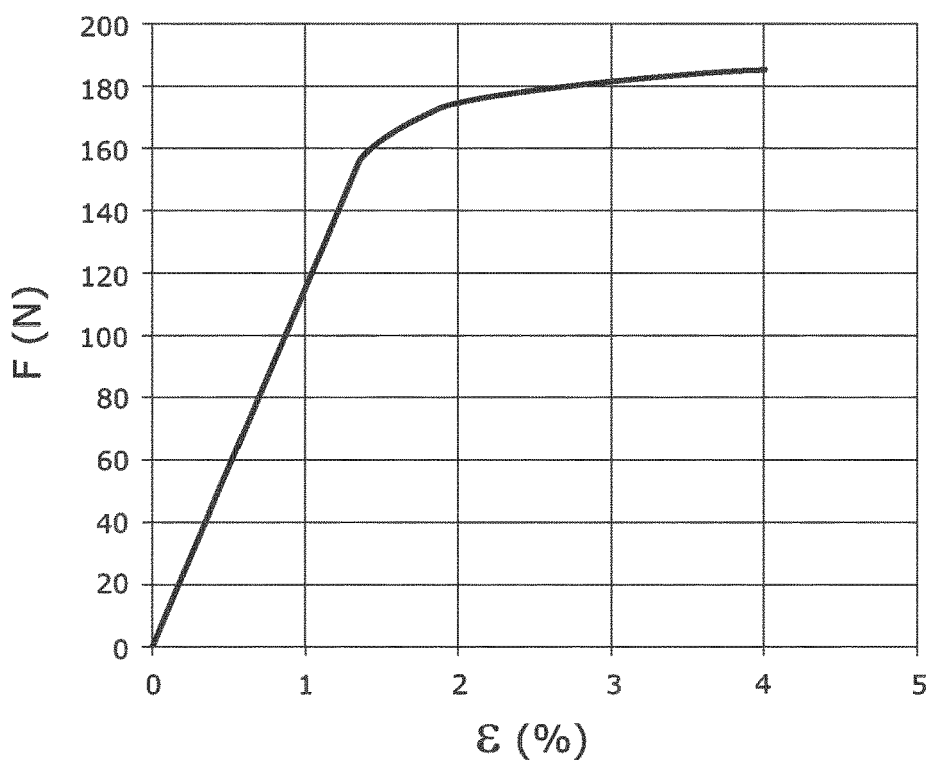
Figure 1C:
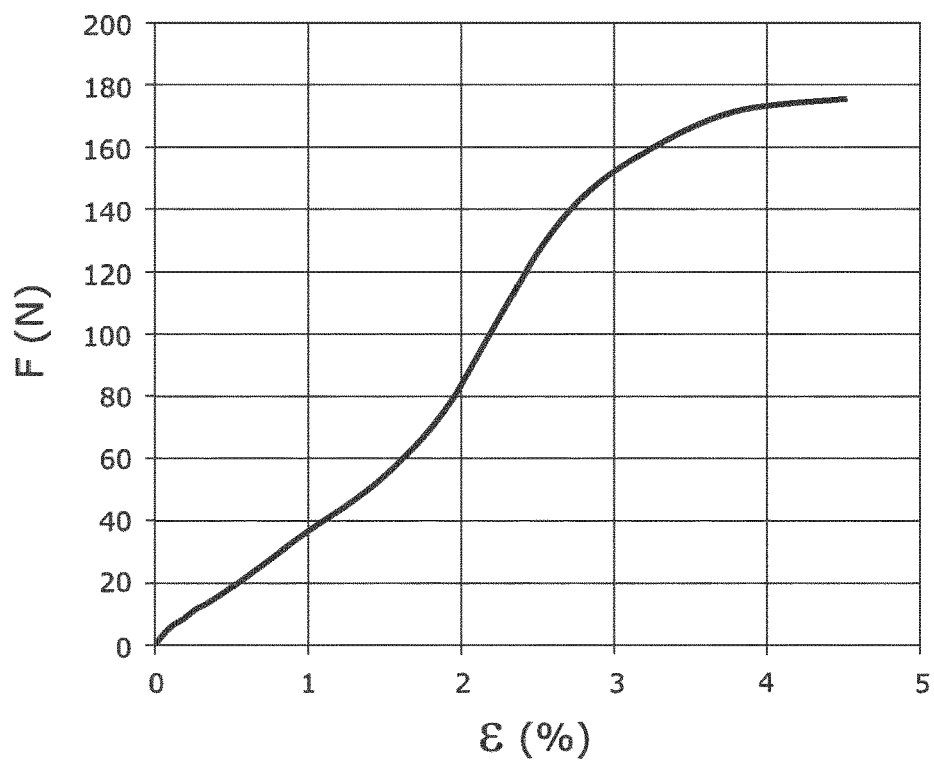

According a first preferred braided hose embodiment of the invention the steel wires of the innermost reinforcement layer have been thermally treated while the steel wires of the outermost reinforcement layer are left unaltered i.e. as drawn with the same force elongation diagram as of FIG. 1a. By heating the wire for seconds above a temperature of 400° C. in a protective atmosphere the plastic region of the wire is greatly increased together with a loss in tensile strength. In order to obtain a wire with a tensile strength of about 2700 N/mm² one must therefore depart from a wire having a tensile strength of about 3100 N/mm². The force—elongation diagram of a thermally altered steel wire is shown in FIG. 1b. The wire has an elongation at break of 4% while it attains a tensile strength of 2700 N/mm². Hence its E-ratio is 67500 MPa i.e. much lower than that of the unaltered wire. This wire is used for the innermost reinforcement layer.

Figure 3:
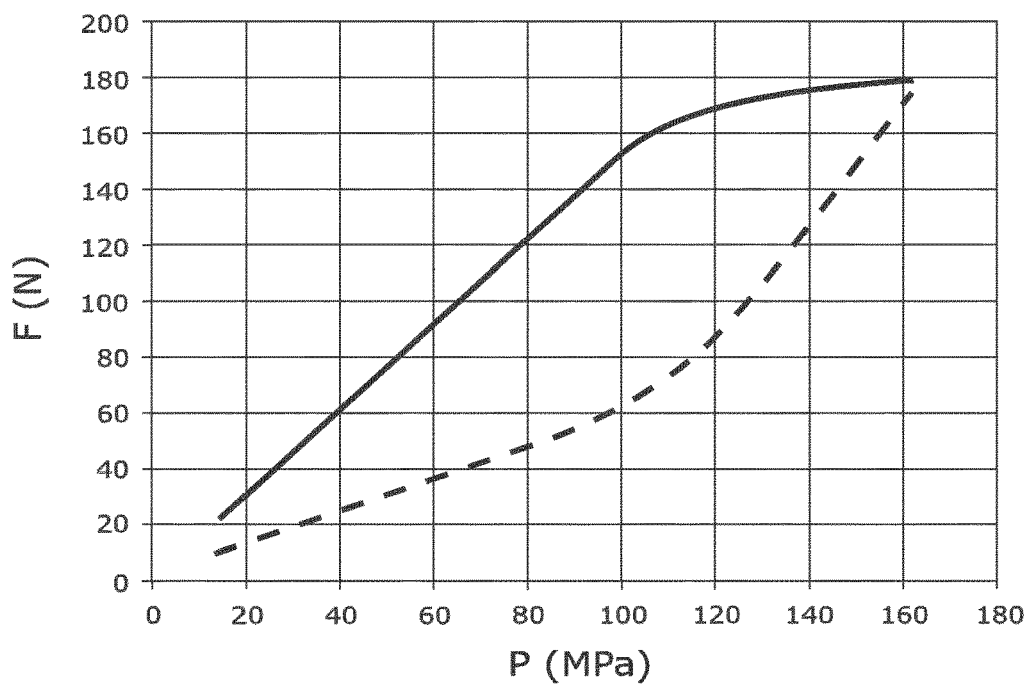
FIG. 3 describes the tensile load on the steel wires of the different reinforcement layers in function of hose pressure according a first braided hose embodiment of the invention.

FIG. 3 shows again the forces occurring in the wires of the reinforcement layers (F (in N)) as a function of the pressure 'P' (in MPa). The full line is for the wires in the innermost reinforcement layer while the dashed line refers to the forces occurring in the outermost reinforcement layer. Due to the much higher elongation at break of the first layer it does not break prematurely and maintains it strength till much higher pressures. The burst pressure now occurs at 160 MPa and all wires are practically loaded to their tensile strength. Compared to the conventional hose, the burst pressure has increased with 14%. However, when comparing the forces occurring in the wires at about one fourth of the burst pressure i.e. the working pressure, there is quite a big discrepancy between the forces acting on the steel wires of the different layers. And it is just in this region, impulse testing is performed. Hence, although the design is optimal for burst pressure, it is unlikely that it will perform also well in impulse life testing.

In a second preferred braided hose embodiment, the steel wires of the innermost reinforcement layer were subjected to a crimping treatment. The untreated wire (with the load—elongation according FIG. 1a) was drawn through a pair of crimping wheels thereby giving the wire a wave-like shape with an amplitude 'a' and a wavelength 'λ'. Within the context of this application with 'double amplitude 2a' is meant the distance between parallel planes touching the extreme tops of the crimped wire minus the diameter of the wire. It can be shown that the extra elongation due to the 'structure of the wire' i.e. the deformation of the wire $\varepsilon_{structural}$ scales according:

$$\varepsilon_{structural} \sim (a/\lambda)^2$$

For this particular case the wire had received a crimp of wavelength 5.3 mm with amplitude 'a' of 0.238 mm. This resulted in an extra elongation of about 2% giving a total elongation at break of 4.5%. The breaking load only slightly decreased to 178 N. The tensile strength was 2600 MPa resulting in an E-ratio of 57 873 MPa which is well below the original 107 689 MPa value of the original wire by a factor of 0.537.

A second steel wire of 0.30 mm diameter originally had a breaking load of 183 N resulting in a tensile strength of 2590 N/mm$^2$ (Normal Tensile strength). The elongation at break was 2.3%. After crimping the steel wire showed an amplitude 'a' of 0.115 mm and a wavelength 'λ' of 5.2 mm. The breaking load was 172 N at an elongation of break of 3.0% i.e. an increase of elongation of 0.7%. Hence the original E-ratio of 113 000 N/mm$^2$ decreased to 81 000 N/mm$^2$ or a factor of 0.717 by the crimping. These two examples illustrate that crimping allows to control the E-ratio very well.

Figure 4:
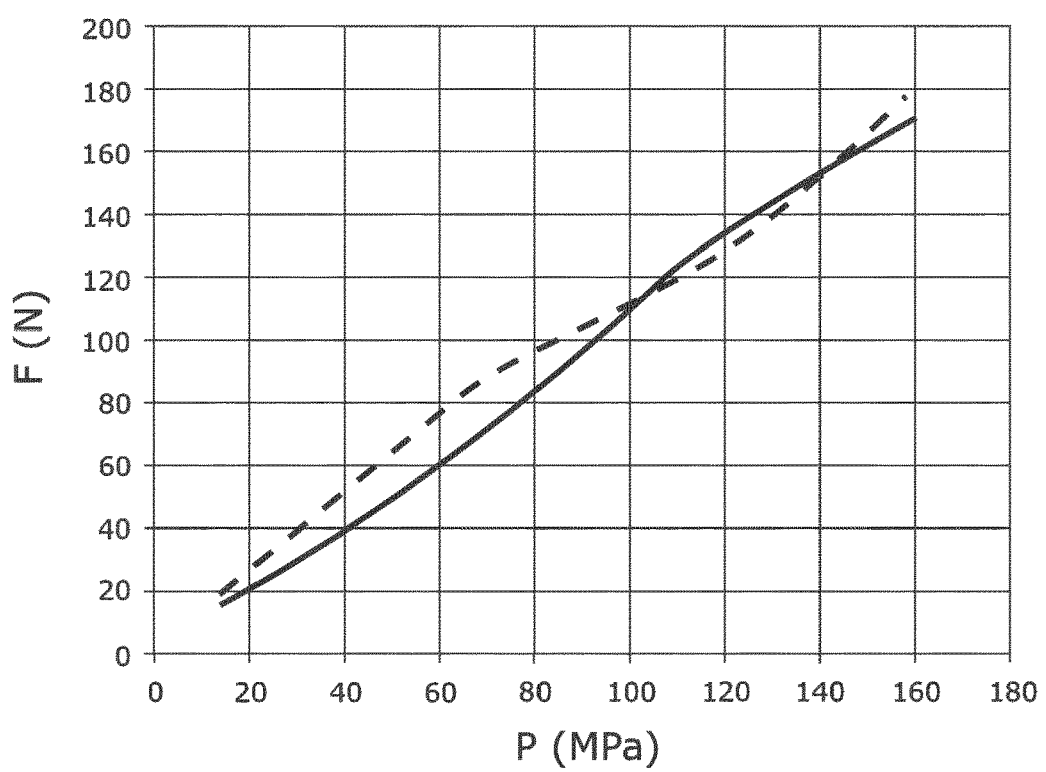
FIG. 4 shows the tensile load on the steel wires of the different reinforcement layers in function of hose pressure according a second braided hose embodiment of the invention.

When now considering a hose of equal build as the conventional one wherein the steel wires of the innermost reinforcement layer are replaced with crimped wires and the outermost reinforcement layers with the same wire but free of crimps the loading of the filaments is remarkably equal for all wires. This is depicted in FIG. 4 wherein the full line depicts the loading of the innermost layer and the dashed line the loading of the outermost layer. Both load lines remain close to one another over the complete pressure range up to burst pressure. As a result, the loading of steel wires will be equal also at the working pressure (about 35 MPa) and also during impulse testing. An improved impulse life is therefore expected. Also an increase in flexibility is observed.

Figure 5:
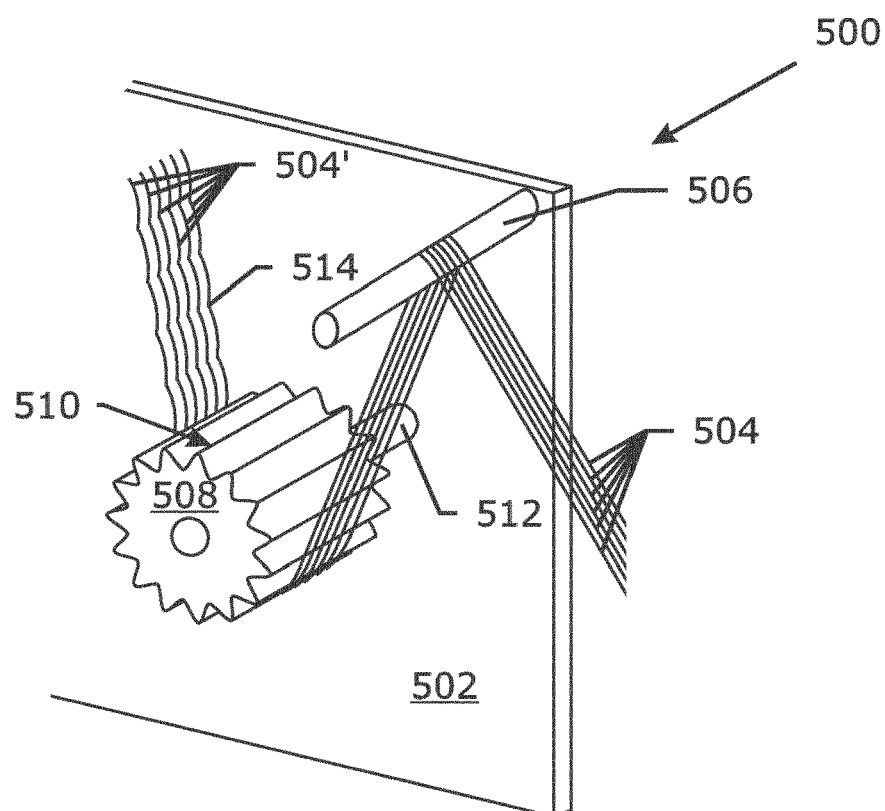
FIG. 5 shows a preforming device to induce bends to the steel wires.
Figure 6:
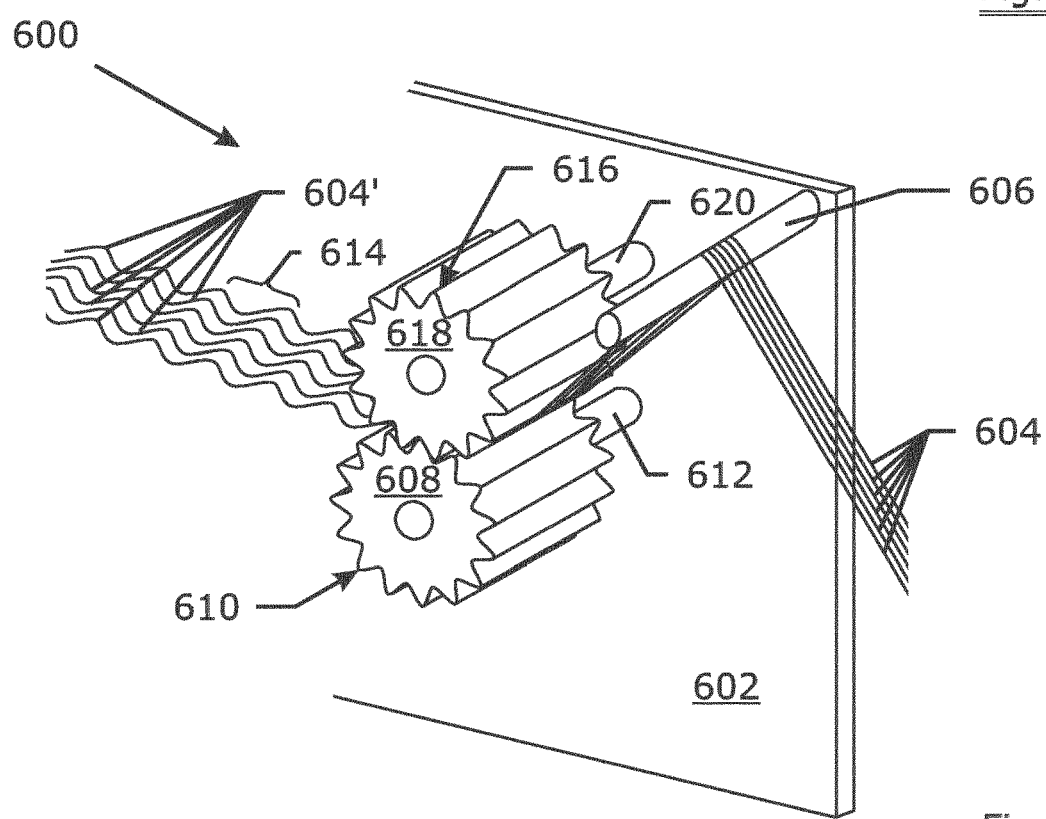
FIG. 6 shows a preforming device to induce crimps into the steel wires.

FIGS. 5 and 6 show devices 500, 600 with which unidirectional bends or bidirectional crimps can be imposed on the wire. Such a device can be easily mounted on the spool carrier of the braiding machine or on the winding head of a spiralling machine. In a braiding or spiralling machine a preforming pin 506, 606 is already present in order to give the steel wires a helical deformation that fits the winding angle of the reinforcement layer. The preforming device can be used off-line i.e. during rewinding of the steel wires on the braiding or spiralling machine bobbins, or can be used in-line i.e. the wires are deformed concurrently with the winding of the wires around the hose body.

In FIG. 5, wires 504 coming from the pay-off spool in parallel are first guided over the preforming pin 506. Preforming pin 506 can either be fixedly or rotatably connected to mounting plate 502. The imposed radius of curvature will—amongst others—depend on diameter and tensile strength of the wires and the diameter and friction properties (if non-rotatable) of the preforming pin 506. The wires are thereafter guided over a polygonal shaped wheel 508 that is mounted rotatable on axis 512. For example, the wheel can be provided with teeth 510. If sufficient tension is maintained on the steel wires, the steel wires 504' leaving the preforming device will show very local and very small bends 514. The bends are always in the same direction (unidirectional). Bends of different wires are 'in phase' when leaving the polygonal shaped wheel i.e. the bends occur at equal positions along parallel wires. The wires are subsequently wound around the intermediate hose body (not shown).

In FIG. 6, wires 604 coming from the pay-off spool in parallel are again first guided over a performer pin 606 that may be rotating or fixed. The wires are subsequently led between two preforming wheels 608 and 618 that are provided with intermeshing teeth 616, 610. The wheels are mounted rotatable on axes 620, 612 to the mounting plate 602. The wheels are sufficiently far apart that the wires 604 can pass without damage. Subsequently the deformed wires 604' are wound around the then already formed intermediate hose body (not shown). The passage through the forming wheels gives the wires a bidirectional, zig-zag like crimp 614. The amplitude of the crimp can be set by the distance between the preforming wheels and the wavelength of the crimp can be set by changing the pitch module of the teeth. Again the crimps are 'in phase'.

FIGS. 7 to 10 illustrate what happens when the inventive concept is applied to a high pressure hose of spiralled build-up with four reinforcement layers that are numbered L1 to L4 from radially most inner to most outer layer as summarised in Table II. The inner diameter of the hose (32 mm) is considerably larger than for the braided hose (9.52 mm) and therefore the reinforcement wall must be much stronger to guarantee about the same working pressure of 36 MPa.

Figure 7A:
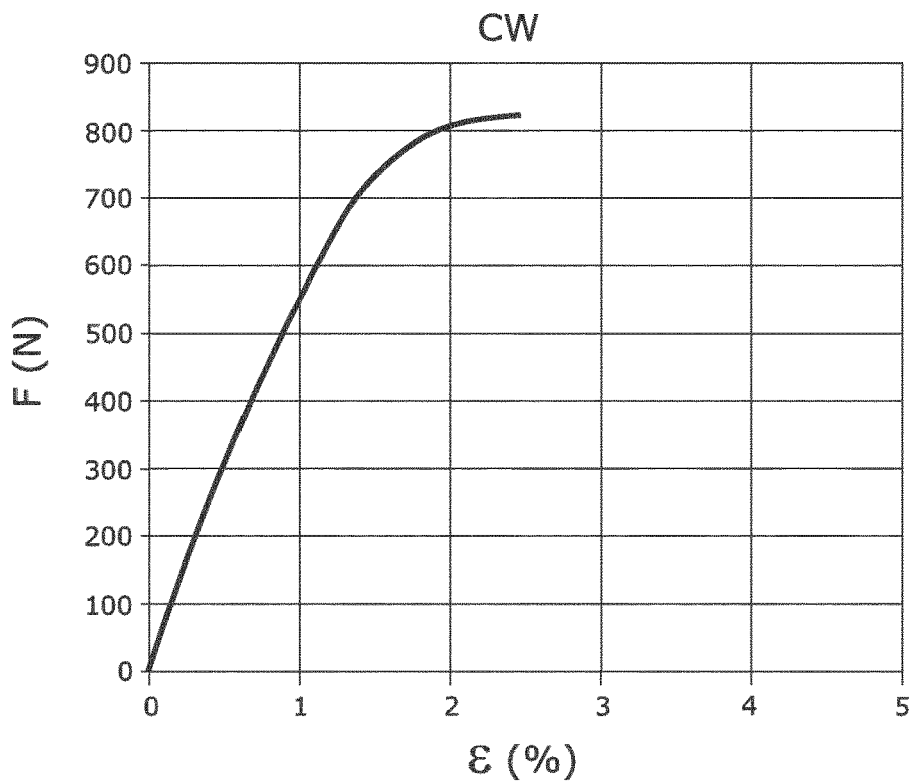
FIG. 7a describes the load elongation curve of a conventional hose reinforcement wire of diameter 0.60 mm, 7b shows the load elongation curve of a heat treated hose reinforcement wire, 7c shows the load elongation curve of a wire having bends.
Figure 8:
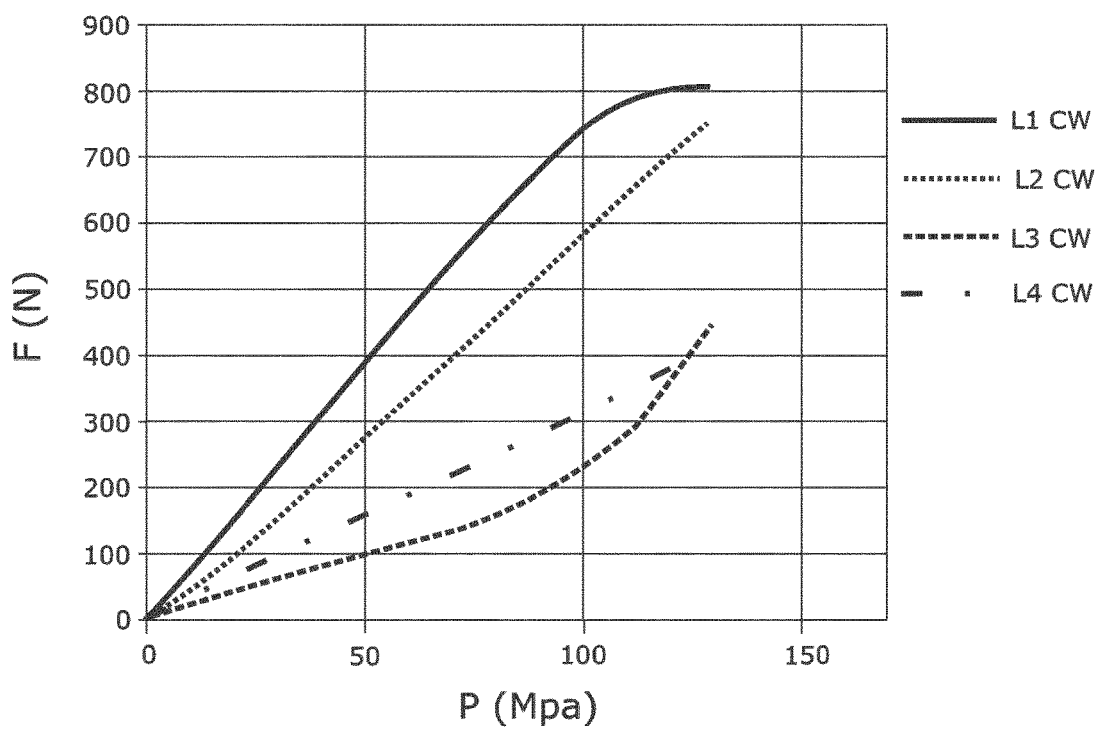
FIG. 8 describes the tensile load on the steel wires of the different reinforcement layers of a conventional spiralled hose as a function of the pressure inside the hose.

The spiralled hose has four steel wire reinforcement layers, situated at four discrete radii. The steel wires are wound in alternating directions (S, Z, S, Z) under slightly increasing winding angles—all close to the neutral angle—when progressing from the inner reinforcement layer to the outer reinforcement layer as is customarily in the field. The wires are of diameter 0.60 mm in all embodiments following:

In a conventional embodiment all wires are straight and not thermally treated. They have a tensile strength of 2900 N/mm$^2$ (HT class) and an elongation at break of 2.5%. The E-ratio of all the steel wires is thus 116000 N/mm$^2$. The Load—Elongation curve of the Conventional Wire (CW) is illustrated in FIG. 7a. The forces occurring in the steel wires of the different reinforcement layers as a function of the pressure applied to the hose is shown in FIG. 8. The curves learn that in a conventional hose, the inner layers are first loaded followed by the radially outer layers. At the burst pressure of 130 MPa the steel wires of the outer two reinforcement layer L3 and L4 have been loaded only to about half of their load bearing capacity.

Figure 7B:
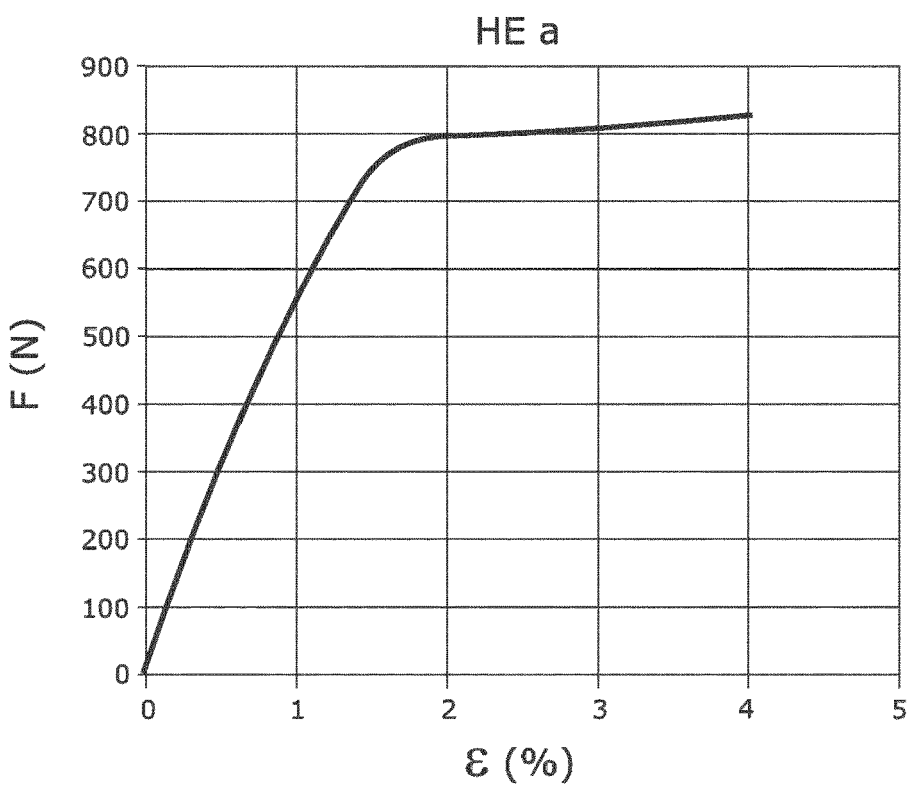
Figure 7C:
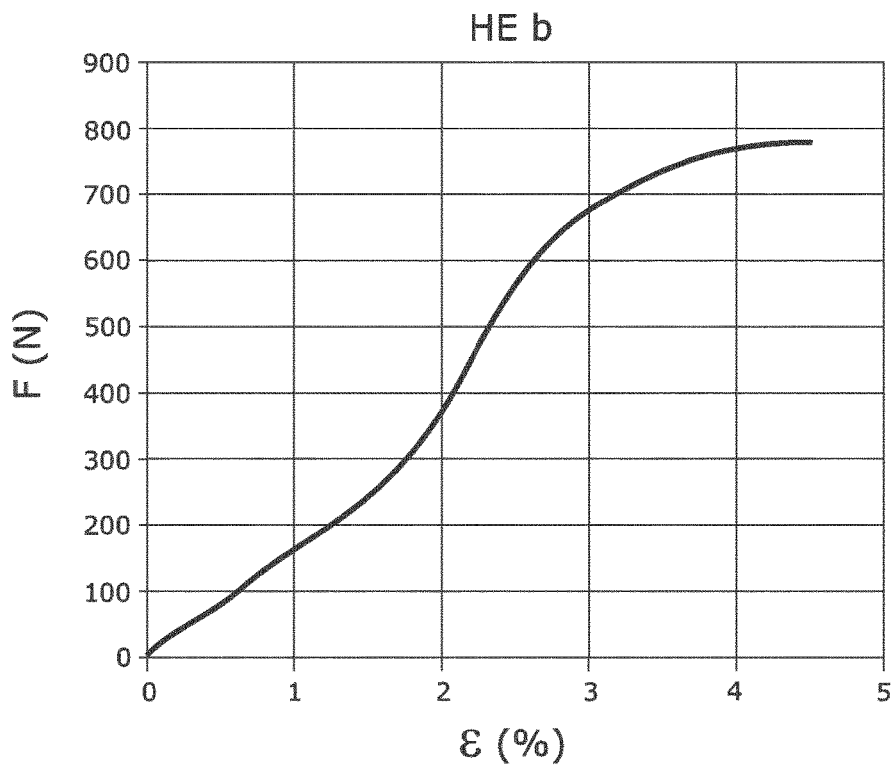

When now the steel wires of the two innermost layers L1 and L2 are replaced with thermally treated wires (designated 'HE a' (High Elongation)) a first preferred spiralled hose embodiment is obtained. The heat treatment of the wires results in an increase of the elongation at break to about 4% with only a little loss in tensile strength. The E-ratio of the steel wire of which the load—elongation curve is illustrated in FIG. 7b is 72504 N/mm². The steel wires of the two outer layers L3 and L4 remain of the conventional type (CW) with the curve as depicted in FIG. 7a. The number of filaments in each layer and the winding angles remain the same as in the conventional embodiment.

Figure 9:
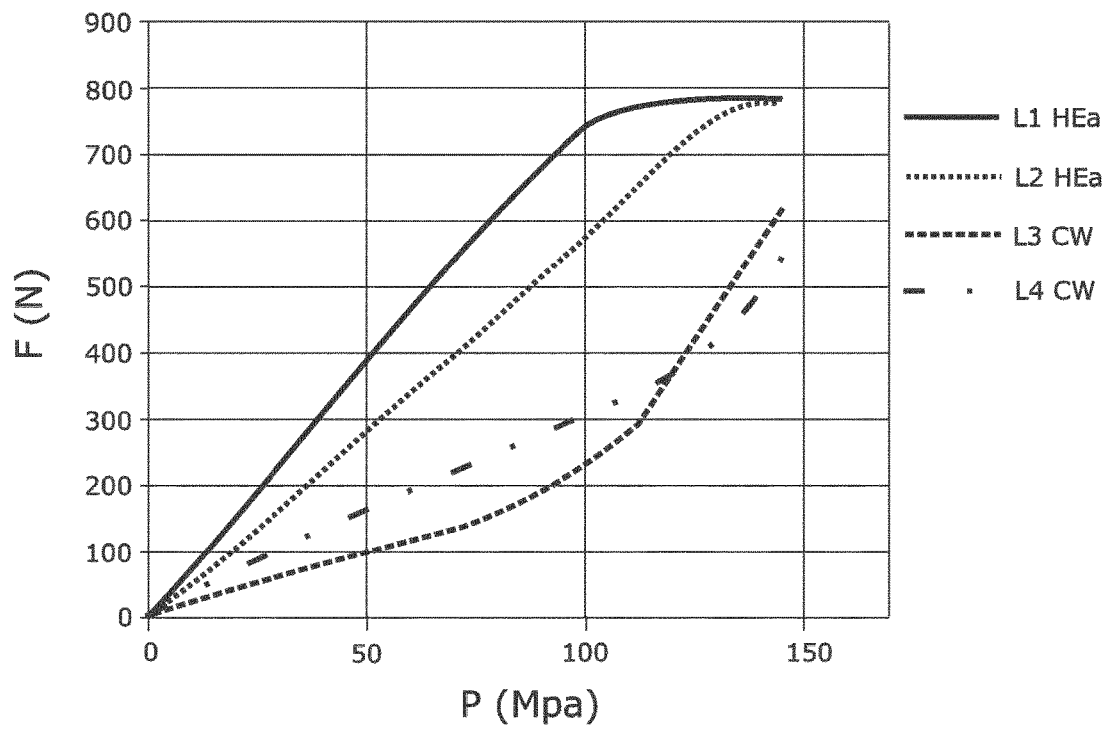
FIG. 9 show the tensile load on the steel wires of the different reinforcement layers as a function of internal pressure of a first spiralled hose embodiment according the invention.

The forces acting on the steel wires of the different reinforcement layers as a function of pressure in this first preferred spiralled hose embodiment are illustrated in FIG. 9. Although there is still quite a difference in loading between the wire of the various layers at intermediate pressures, the pressure at burst has much improved to 145 MPa due to the elongation of the inner layers L1 and L2.

In a second preferred spiralled hose embodiment the steel wires of the inner layers L1 and L2 are replaced with steel wires with bends by guiding conventional 0.60 mm wires under tension over a polygonal wheel. The bends increase the elongation at break of the wire from 2.5% up to 4.5% with only a small decrease in breaking load: from 820 N to 778 N. The E-ratio of the steel wire reduces from 116 000 N/mm² (conventional wires) to 61147 N/mm². The bends are outwardly oriented relative to the axis of the hose. The outer two layers L3 and L4 are made of conventional wires.

Figure 10:
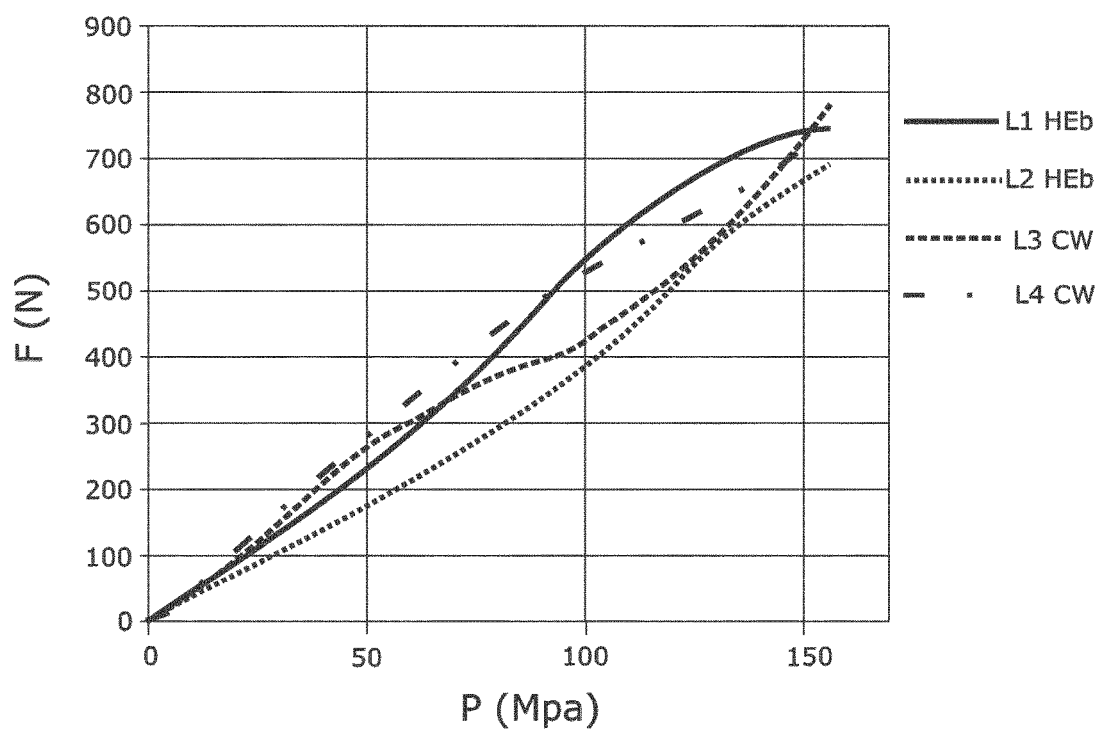
FIG. 10 displays the force on the steel wires of the different reinforcement layers as a function of internal pressure of a second spiralled hose embodiment according the invention.

The force per wire of the wires in the different layers as a function of the pressure is presented in FIG. 10. The forces acting on the filaments remain in a relatively narrow band and the loading of all wires is close to equal at all pressures. This is expected to result in a major improvement of impulse life. Moreover, the burst pressure has increased further to 155 MPa.

TABLE II

Spiralled hose

| | |
|---|---|
| Inner diameter of core tube | 32 mm |
| Diameter of first steel wire reinforcement layer L1 | 36.6 mm |
| Number of filaments in layer | 110 |
| Winding angle | 52.5° S |
| Diameter of steel wire | 0.60 mm |
| Thickness of intermediate elastomer material layer | 0.3 mm |
| Diameter of second steel wire reinforcement layer L2 | 38.4 mm |
| Number of filaments in layer | 112 |
| Winding angle | 53.8° Z |
| Diameter of steel wire | 0.60 mm |
| Thickness of intermediate elastomer material layer | 0.30 mm |
| Diameter of third steel wire reinforcement layer L3 | 40.2 mm |
| Number of filaments in layer | 114 |
| Winding angle | 55° S |
| Diameter of steel wire | 0.60 mm |
| Thickness of intermediate elastomer material layer | 0.30 mm |
| Diameter of fourth steel wire reinforcement layer L4 | 42.0 mm |
| Number of filaments in layer | 116 |
| Winding angle | 56.2° Z |
| Diameter of steel wire | 0.60 mm |
| Thickness outer protective layer | 1.80 mm |
| Intended work pressure | 35 MPa |

The invention claimed is:

1. A hose for conveying fluids under pressure comprising an elastomer core tube, at least two reinforcement layers at distinct reinforcement layer radii, said reinforcement layers being radially separated by intermediate elastomer material layers and an outer protective layer covering the outermost reinforcement layer,
wherein at least two of said reinforcement layers comprise steel wires helically wound around the axis of said hose,
wherein the steel wires of the radially outermost steel wire reinforcement layer have the highest E-ratio of the at least two reinforcement layers, the steel wires of the innermost steel wire reinforcement layer have the lowest E-ratio of the at least two reinforcement layers differing from said highest E-ratio, whereby the E-ratio of any steel wire reinforcement layer is not lower than the E-ratio of any inner laying steel wire reinforcement layer, said E-ratio being equal to the ratio of the tensile strength over the elongation at break of said steel wire,
wherein said E-ratio is between 70,000 N/mm² up to 200,000 N/mm² for the radially outermost steel wire reinforcement layer and between 30,000 N/mm² and 120,000 N/mm² for the radially innermost steel wire reinforcement layer,
wherein said steel wires of at least the innermost steel wire reinforcement layer have crimps or bends for altering said E-ratio, while said steel wires of at least the outermost steel wire reinforcement layer are free of bends or crimps,
wherein said steel wires of at least the innermost and outermost steel wire reinforcement layer are of the same diameter.

2. The hose according to claim 1, wherein the elongation at break of said steel wires of at least said innermost steel wire reinforcement layer is higher by the crimps or bends in said steel wire compared to the steel wire that is free of crimps or bends by at least 0.3% and at most 4%.

3. The hose according to claim 1, wherein said steel wires of at least the innermost and outermost steel wire reinforcement layer are of the same tensile class, said tensile class being one out of the group consisting of:
Low tensile class with steel wires having a tensile strength from 2150 to below 2450 N/mm²;
Normal tensile class with steel wires having a tensile strength from 2450 to below 2750 N/mm²;
High tensile class with steel wires having a tensile strength from 2750 N/mm² to below 3050 N/mm²;
Super tensile class with steel wires having a tensile strength from 3050 to 3350 N/mm².

4. The hose according to claim 1, wherein said steel wires in at least the innermost steel wire reinforcement layer are periodically unidirectionally bent for reducing the E-ratio of said steel wire reinforcement layer.

5. The hose according to claim 1, wherein said steel wires in at least the innermost steel wire reinforcement layer are periodically bidirectionally crimped for reducing the E-ratio of said steel wire reinforcement layer.

6. The hose according to claim 2, wherein said steel wires of at least the innermost and outermost steel wire reinforcement layer are of the same tensile class, said tensile class being one out of the group consisting of:
Low tensile class with steel wires having a tensile strength from 2150 to below 2450 N/mm²;
Normal tensile class with steel wires having a tensile strength from 2450 to below 2750 N/mm²;
High tensile class with steel wires having a tensile strength from 2750 N/mm² to below 3050 N/mm²;
Super tensile class with steel wires having a tensile strength from 3050 to 3350 N/mm².

7. The hose according to claim 2, wherein said steel wires in at least the innermost steel wire reinforcement layer are periodically unidirectionally bent for reducing the E-ratio of said steel wire reinforcement layer.

8. The hose according to claim 2, wherein said steel wires in at least the innermost steel wire reinforcement layer are periodically bidirectionally crimped for reducing the E-ratio of said steel wire reinforcement layer.

9. A method to produce a hose for conveying fluids under high pressure according to claim 1 comprising the steps of
- providing an elastomer core tube;
- winding steel wires around said elastomer core tube in a spiralled or braided innermost steel wire reinforcement layer;
- applying an intermediate elastomer material layer on said innermost steel wire reinforcement layer;
- winding one more spiralled or braided steel wire reinforcement layer on said intermediate elastomer material layer;
- optionally applying an intermediate elastomer material layer on said then outermost steel wire reinforcement layer;
- optionally applying another spiralled or braided steel wire reinforcement layer on said intermediate elastomer material layer;
- optionally repeating the two previous steps one or more times;
- applying an outer protective layer covering the outermost reinforcement layer;
- wherein the steel wires of said innermost steel wire reinforcement layer have an E-ratio that is lower than the E-ratio of the steel wires of said radially outermost steel wire reinforcement layer, whereby the E-ratio of any steel wire reinforcement layer is not lower than the E-ratio of any inner laying steel wire reinforcement layer,
- wherein said E-ratio is between 70,000 N/mm$^2$ up to 200,000 N/mm$^2$ for the radially outermost steel wire reinforcement layer and between 30,000 N/mm$^2$ and 120,000 N/mm$^2$ for the radially innermost steel wire reinforcement layer,
- wherein said steel wires of at least the innermost steel wire reinforcement layer have crimps or bends for altering said E-ratio, while said steel wires of at least the outermost steel wire reinforcement layer are free of bends or crimps,
- wherein said steel wires of at least the innermost and outermost steel wire reinforcement layer are of the same diameter.

10. The method according to claim 9, wherein said steel wires of at least said innermost steel wire reinforcement layer are thermally treated to an E-ratio between 30,000 and 120,000 N/mm$^2$ while said E-ratio of said steel wires of at least the outermost steel wire reinforcement layer is between 70,000 N/mm$^2$ and 200,000 N/mm$^2$.

11. The method according to claim 9, wherein said steel wires of at least said innermost steel wire reinforcement layer are preformed with a preforming device that induces crimps or bends into said steel wires.

12. The method according to claim 11, wherein said steel wires are preformed with a preforming device prior to the step of winding steel wires in at least said innermost spiralled or braided steel wire reinforcement layer.

13. The method according to claim 11, wherein said steel wires are preformed with a preforming device concurrently with the step of winding steel wires in at least said innermost steel wire reinforcement layer.

14. The method according to claim 11, wherein said preforming device comprises a rotatable pin of substantially polygonal shape where over said steel wires are led under tension thereby inducing periodical unidirectional bends on said steel wires.

15. The method according to claim 11, wherein said preforming device comprises a pair of intermeshing gears where between said steel wires are led thereby inducing periodical bidirectionial crimps in said wires.

* * * * *